United States Patent [19]

Carlin

[11] 4,127,643
[45] Nov. 28, 1978

[54] PREPARATION OF PIGMENTARY CHROMIC OXIDE

[75] Inventor: William W. Carlin, Portland, Tex.

[73] Assignee: PPG Industries, Inc., Pittsburgh, Pa.

[21] Appl. No.: 848,044

[22] Filed: Nov. 3, 1977

[51] Int. Cl.$^2$ ............................................. C01G 37/02
[52] U.S. Cl. ..................................... 423/607; 106/302
[58] Field of Search .......................... 423/607; 106/302

[56] References Cited

U.S. PATENT DOCUMENTS

| | | | |
|---|---|---|---|
| 524,470 | 8/1894 | Slocum | 423/607 |
| 1,158,379 | 10/1915 | Gessler | 423/607 |
| 1,422,703 | 7/1922 | Head | 423/607 |
| 1,723,556 | 8/1929 | Meyer et al. | 423/607 |
| 1,728,510 | 9/1929 | Roth | 423/607 |
| 3,600,314 | 8/1971 | Haines | 423/607 |

FOREIGN PATENT DOCUMENTS

| | | | |
|---|---|---|---|
| 512,959 | 5/1955 | Canada | 423/607 |
| 302,178 | 3/1930 | United Kingdom | 423/607 |

Primary Examiner—Herbert T. Carter
Attorney, Agent, or Firm—Richard M. Goldman

[57] ABSTRACT

Disclosed is a method of preparing a crystalline pigmentary chromic: oxide, $Cr_2O_3$, having a mass average particle size less than about 1 micron. According to the disclosed method, a substantially dry solid composition of an alkali metal chromate and carbon is heated in an inert atmosphere to a temperature of above about 500° Centigrade and maintained thereat until substantially all of the alkali metal chromate is decomposed. Thereafter, the solid composition is cooled while still in an inert atmosphere and thereafter pigmentary $Cr_2O_3$ is recovered therefrom.

3 Claims, No Drawings

PREPARATION OF PIGMENTARY CHROMIC OXIDE

DESCRIPTION OF THE INVENTION

Chromic oxide, also known as chromic oxide green, having the formula $Cr_2O_3$ is useful as a ceramic coloring agent and as a corrosion inhibiting pigment. It is especially useful where chemical resistance and temperature resistance are required, for example, in coloring cement and in coloring roofing. It is also useful in providing pigment where the reflectance spectrum of the green surface should approximate that of green foliage. Coarse grade chromium pigment is prepared according to the reaction:

$$Na_2Cr_2O_7 + 2C \rightarrow Na_2CO_3 + Cr_2O_3 + CO$$

where such carbon sources as charcoal and wood flour are used. Other methods of production of the pigmentary product include reaction with sulfur and heating at high temperatures.

However, in certain pigmentary applications it is particularly important to have a fine particle, that is, particles having a mass average partical size of less than 1 micron, for example, where more than 75 percent of the particles, by weight, have a particle size of less than 1 micron.

It has now been found that pigmentary grade chromic oxide, $Cr_2O_3$, having a mass average particle size of less than 1 micron, may be prepared by the thermal decomposition of an alkali metal dichromate in the presence of particulate carbon and an inert atmosphere.

DETAILED DESCRIPTION OF THE INVENTION

According to the disclosed invention, there is provided a method of preparing a crystalline pigmentary chromic oxide, $Cr_2O_3$, product. The crystalline pigmentary chromic oxide has a mass average particle size of less than about 1 micron. According to the disclosed method, a substantially dry solid composition is provided which consists essentially of an alkali metal dichromate and at least 40 mole percent carbon, basis total moles of alkali metal chromate and carbon. This substantially dry, solid composition is heated in an inert atmosphere to above about 500° C. and maintained above about 500° C. until substantially all of the alkali metal chromate is decomposed to yield chromic oxide, $Cr_2O_3$. Thereafter, the solid composition is cooled down in an inert atmosphere and pigmentary chromic oxide is subsequently recovered therefrom.

The pigmentary product is chromic oxide, $Cr_2O_3$, substantially free of water hydration, and having a green color. The mass average particle size of the pigmentary product is less than 1 micron. As used herein, the mass average particle size being less than 1 micron means that particle size of at least 75 percent by weight or more of chromic oxide is less than 1 micron.

According to the method of this invention, crystals, for example, wet crystals, of the material $M_2Cr_2O_7$, where M may be sodium or potassium, and a solid source of inorganic carbon are heated in an inert atmosphere. Generally, the $M_2Cr_2O_7$ is in the form of crystals containing water of hydration, such as $M_2Cr_2O_7 \cdot 2H_2O$, and having a crystal size of about 60 microns to about 100 microns.

The carbon, preferably inorganic carbon such as graphite, charcoal, coal, or the like, has a particle size of from about 60 microns to about 100 microns whereby it may be intimately mixed with the alkali metal dichromate. The preferred source of carbon is a charcoal such as bone charcoal, wood charcoal, or charcoal of various low burning naturally occurring products. Alternatively, coke or graphite, or the like may be used as a source for the particulate inorganic carbon.

When the feed contains damp or wet solids, it is preferably dried prior to being heated to the temperatures herein contemplated. The solid feed to the process generally consists essentially of the alkali metal dichromate and carbon, where the carbon content is greater than about 40 mole percent of the total carbon and dichromate and preferably from about 40 to about 60 mole percent thereof. The solid feed is generally substantially free of sulfur and substantially free of such mineral acids as sulfuric acid, hydrochloric acid, and the like, and is substantially free of water prior to thermal decomposition thereof.

The thermal decomposition is carried out with an inert atmosphere. Typically, the inert atmosphere is provided by carbon dioxide, for example, carbon dioxide and nitrogen, or an atmosphere consisting essentially of carbon dioxide. The process is further carried out at atmospheric pressure rather than at an elevated pressure or reduced pressure.

The temperature of the reaction is above about 500° C., and preferably above about 580° C., although temperatures above about 600° C. are generally not considered necessary. Preferably the reaction is carried out at a temperature of about 580° C. to about 600° C.

The reaction is generally carried out for from about 20 minutes to about 2 hours although the time depends upon the degree of comminution of the dichromate, the degree of comminution of the carbon, and the degree of mixing of the carbon and the dichromate. As a general rule, the reaction is carried out until substantially all of the alkali metal chromate is reduced to chromic oxide.

Thereafter, the solid composition, consisting essentially of chromic oxide, is cooled under an inert atmosphere, for example, carbon dioxide, to below the reaction temperature thereof, for example, down to about 100° C. or even lower. Thereafter, the solid material is quenched, for example, in water. This serves to leach out the soluble components therein, for example, alkali metal carbonate and alkali metal oxide. The slurry resulting from quenching the solid particle may then be filtered, to obtain a filtrate of an aqueous alkali metal compound such as alkali metal carbonate and alkali metal hydroxide, and a solid pigmentary grade chromic oxide.

The yield of pigmentary grade chromic oxide substantially free of water of hydration is in excess of 90 percent and may be in excess of about 95 percent. The chromic oxide itself is generally of a purity in excess of 98.5 percent, and frequently as high as 99 percent.

In the quenching process, the water solubilizes the sodium or potassium compounds such as $M_2Cr_2O_7$ and $M_2CrO_4$ where M is as defined above. The resulting solid, $Cr_2O_3$, is then separated from the soluble alkali metal compounds which alkali metal compounds may be recycled to the process. The solids, $Cr_2O_3$, carrying with them some entrapped water, are then heated, for example, above about 110° C., in order to drive off the entrapped water, thereby yielding pigmentary grade green chromic oxide.

Generally, the feed to the process may be heated for example to between 60° C. and 110° C. under a vacuum whereby to dry the composition and thereafter the dry, solid liquid composition consisting essentially of the alkali metal chromate and carbon is fed to the process.

According to the method herein described, particulate $Na_2CR_2O_7$, having a particle size of about 60 microns, is admixed with particulate bone charcoal, having a particle size of about 60 microns, at a mole ratio 0.7 mole of carbon per total moles of $Na_2Cr_2O_7$. The resulting mixture of sodium dichromate and bone charcoal is then heated to a temperature of about 500° C. under a carbon dioxide atmosphere at about one atmosphere total pressure and a carbon dioxide partial pressure of about one atmosphere. The powders are then maintained at a temperature of above about 500° C., in a carbon dioxide atmosphere for about one and one-half hours. Thereafter the material is cooled to below about 100° C., and a pigmentary $Cr_2O_3$ having a mass average particle size of less than 1.0 micron is recovered.

EXAMPLE

Sodium dichromate ($Na_2Cr_2O_7$) was heated in an inert gas atmosphere of $CO_2$ both with and without particulate carbon. The chromic oxide ($Cr_2O_3$) products were compared.

Sodium dichromate ($Na_2Cr_2O_7$) was ground to a particle size of 60 microns and then dried under a vacuum of 30 inches of mercury at 80° C. for 8 hours. At 10 gram sample of the dried sodium chromate was in a platinum boat, which was then placed in a 1 inch outside diameter quartz tube in a Lindberg Hevi-Duty furnace. The furnace was purged with $CO_2$ and then heated to between 580° C. and 600° C. for one hour. The tube was then removed from the furnace and cooled to room temperature under a $CO_2$ atmosphere. The solid $Cr_2O_3$ product was then washed twice with distilled water. The resulting $Cr_2O_3$ product contained in excess of 99.3 weight percent $Cr_2O_3$ and had a particle size distribution of 70 weight percent in the 5-40 micron range and 30 weight percent in the 0.5 to 5 micron range.

Another sample of sodium dichromate ($Na_2Cr_2O_7$) was also ground to a particle size of 60 microns. Ten grams of the sodium dichromate was mixed with 2 grams of minus 400 mesh bone charcoal. The sodium dichromate and charcoal were then placed in a platinum boat, dried, and heated under a carbon dioxide atosphere as described above. Thereafter, it was cooled to room temperature under a carbon dioxide atmosphere and washed twice with distilled water. The resulting chromic oxide ($Cr_2O_3$) crystalline solid product had a particle size distribution of 25 weight percent in the 1 to 3 micron range and 75 weight percent below 1 micron.

I claim:

1. A method of preparing crystalline pigmentary $Cr_2O_3$ having a mass average particle size less than about one micron, which method comprises:
    (a) providing a substantially dry, solid composition consisting essentially of an alkali metal dichromate chosen from the group consisting of potassium dichromate and sodium dichromate and at least about 40 mole percent carbon, basis total alkali metal dichromate and carbon;
    (b) heating the solid composition in an inert atmosphere to above about 500° C. will substantially all of the alkali metal dichromate is decomposed; and
    (c) cooling the solid composition in an inert atmosphere, contacting the solid composition with water, and separating solid pigmentary $Cr_2O_3$ from soluble alkali metal compounds.

2. The method of claim 1 comprising heating a solid composition of alkali metal dichromate and carbon to between 60° C. and 110° C. under a vacuum to substantially dry said composition and thereafter heating said solid composition above about 500° C. in an inert atmosphere.

3. The method of claim 1 wherein the inert atmosphere is a carbon dioxide atmosphere.

* * * * *